Oct. 30, 1923.
E. B. GRACE ET AL
1,472,649
FREIGHT HANDLING TRUCK
Original Filed July 16, 1921
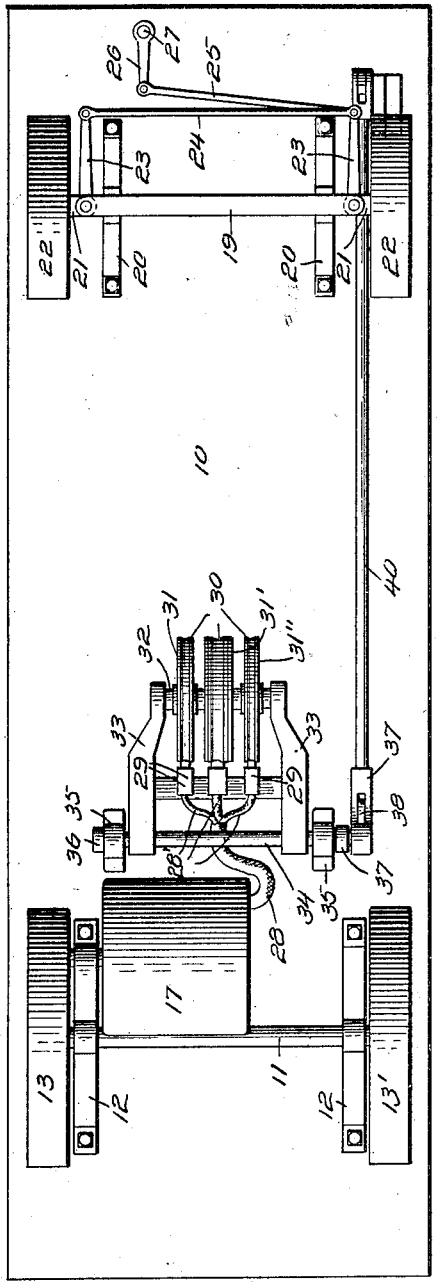
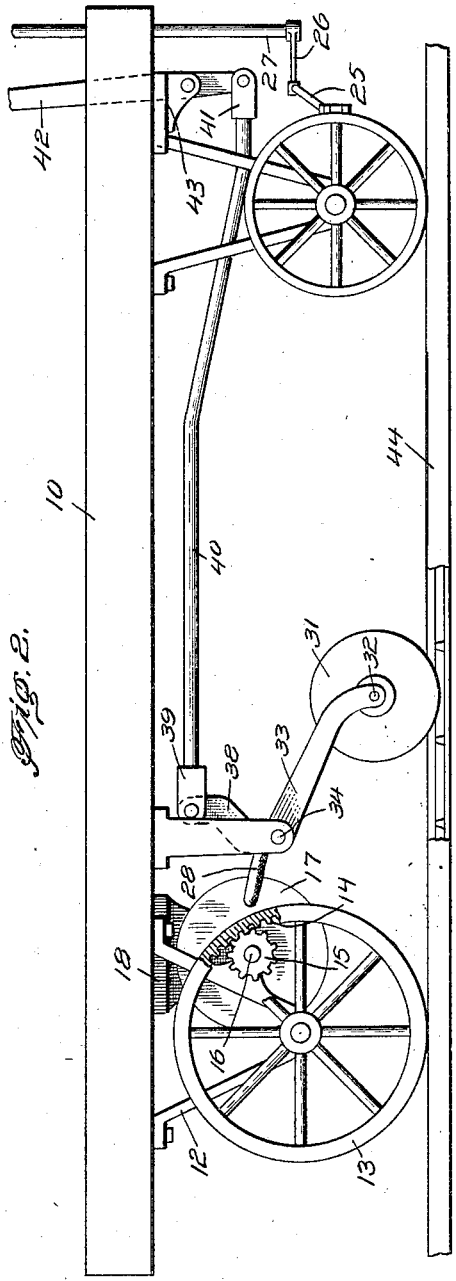
INVENTOR.
E.B.Grace and W.J.Laffey.
BY
Geo. P. Kimmel.
ATTORNEY.

Patented Oct. 30, 1923.

1,472,649

UNITED STATES PATENT OFFICE.

EDWIN B. GRACE AND WILLIAM J. LAFFEY, OF MEMPHIS, TENNESSEE.

FREIGHT-HANDLING TRUCK.

Application filed July 16, 1921. Serial No. 485,242. Renewed September 15, 1923.

*To all whom it may concern:*

Be it known that we, EDWIN B. GRACE and WILLIAM J. LAFFEY, citizens of the United States, residing at Memphis, in the county of Shelby and State of Tennessee, have invented certain new and useful Improvements in Freight-Handling Trucks, of which the following is a specification.

The invention relates to improvements in freight or baggage trucks generally, and more particularly to a type of the same adapted for the accomplishment of the purposes of the freight handling system as described and illustrated in our copending application, filed July 16, 1921, and Serial Number 485244 now Patent 1,417,242, issued May 23, 1922.

The principal object of the invention is to provide for a truck construction of a character necessary for the carrying out of the freight and baggage handling systems, as aforesaid, and one particularly designed to facilitate the handling of freight or the like and the transferring of the same between fixed points, as from freight car sidings to loading platforms of freight houses or vice versa.

Another object of the invention is to provide for a truck of the character mentioned, and one embodying the use of ordinary ground wheels so as to dispense with the use of a railed trackway, and to be readily movable manually as well as by power as desired or necessary for the purpose.

A further object of the invention is to provide for a truck of the class specified, and one electrically driven, a trolley head being provided on the same for engagement with suitable conductors, or conductor rails, for the transmittal of current to the operating motor thereof, during the major operation of the same.

Another object of the invention is to provide for a truck of the character set forth, and one embodying a simplified form of steering means for facilitating the direction of travel thereof, either with or without the trolley head being in its operative position, the latter functioning, in its cooperation with the conductor rail, to aid in the steering of the truck, when operative.

With the foregoing and other objects in view, the invention resides in the certain novel and useful construction and arrangement of parts as will be hereinafter more fully described, set forth in the appended claims, and illustrated in the accompanying drawings, in which:—

Figure 1 is a bottom plan view of the preferred embodiment of the truck, and,

Fig. 2 is a side elevation thereof.

Referring to the drawings, the numeral 10 indicates the body or platform portion of the truck having a front axle 11 suitably journaled in brackets 12 secured to the under side thereof and on the opposite ends of which are secured ground wheels 13 and 13', the ground wheel 13 having its inner rim surface formed to provide an annular gear tooth formation 14, which is arranged in meshing relation with a pinion 15 carried on the shaft 16 of an electric motor 17, the latter having its supporting base 18 secured to the under side of the truck body or platform.

The rear axle 19 is stationarily supported in suitable brackets or bolsters 20, and has pivoted on its opposite ends the spindles 21 on which are secured the ground wheels 22, the spindles 21 having rigid arms 23 projecting forwardly therefrom and connected together by means of a rod 24 at their free ends. A reach rod 25 is commonly pivoted with the adjacent end of the rod 24 to one of the spindle arms 23, and at its other end to a crank or lever arm 26 formed with or otherwise secured to the lower projecting ends of a steering post 27, which extends upwardly through the forward end portions of the body or platform 10, and is adapted for manipulation for the steering of the truck under certain conditions of operation as will be hereinafter more clearly explained.

For the operation of the truck, current is to be led to the electric motor 17 by means of a compound lead 28 which preferably has three conductors 28' for connection to main trolley wires or conductors of a three phase alternating current circuit. However, the motor 17 may be of any other type than that mentioned, and the lead 28 will be correspondingly changed or connected for the proper operation of the same.

In the adaptation of the invention, as shown, the leads 28' are individually connected to brushes 29 which are arranged to contact with the annular contacts 30 of the trolley wheels 31, 31', and 31'', the latter being mounted in suitably spaced relation on a stub shaft 32 journaled at its opposite ends in arms 33 which are, in turn, secured on a pivoted shaft 34 journaled in spaced brackets 35 and secured to the under side of the body or platform of the truck. The shaft 34 has a fixed collar 36 at one end and outside of the bracket 35 adjacent thereof, and a fixed collar 37 on its other end portion and arranged to the outer side of the bracket 35 complemental thereto. Fixedly secured on the outer end of the shaft 34 is a crank or lever arm 38 pivotally connected at its outer end to a bifurcated coupling 39 which is threaded on or otherwise secured to one end of a reach rod 40, the forward end of the latter having thereon a second bifurcated coupling 41 which pivotally connects the lower end of a lever 42. The hand lever 42 is pivotally mounted in a bracket 43 secured to the body or platform adjacent to the rear end thereof, and is adapted to be manually manipulated to raise and lower the trolley head to and from contacting relation with respect to the current conducting rail construction 44. This conductor rail is preferably in the form as shown and described in our copending application filed March 18, 1821, and Serial Number 453,454, as hereinbefore identified.

It is well understood that, while a preferred embodiment of the truck has been described and illustrated herein in specific terms and details of construction and arrangement of parts, various changes in and modifications of the same may be resorted to without departing from the spirit of the invention, or the scope of the claims appended hereto.

Having thus fully described the invention, what is claimed, is:—

1. A power driven truck comprising a wheeled body, an electric motor supported from the under side of said body and operably associated with certain of the wheels thereof for propelling said body, a rock shaft pivotally supported from the under side of said body, a trolley head fixed to and suspended from said shaft and arranged under said body and adapted to electrically connect said motor with a source of supply, and a hand operated lever mechanism extended below said body and connected to said shaft for rocking the latter whereby the head will be bodily carried with the shaft and be shifted from and to operative connection with the sources of supply.

2. A car driven truck comprising a wheeled body, an electric motor supported from the underside and operably connected with certain of the wheels of said body for propelling the latter, a transverse rock shaft pivotally suspended from the underside of said body, a pair of parallel arms fixed to and projecting forwardly from said shaft, a trolley head arranged between and fixedly secured to said arms and electrically connected to said motor, said shaft, arms and head bodily movable, and means for rocking the shaft to swing said head into and out of engagement with a source of electrical energy.

In testimony whereof, we affix our signatures hereto.

EDWIN B. GRACE.
WILLIAM J. LAFFEY.